July 10, 1923.
H. C. ROSE ET AL
1,461,098
MILLING MACHINE
Filed Aug. 15, 1921
2 Sheets-Sheet 1
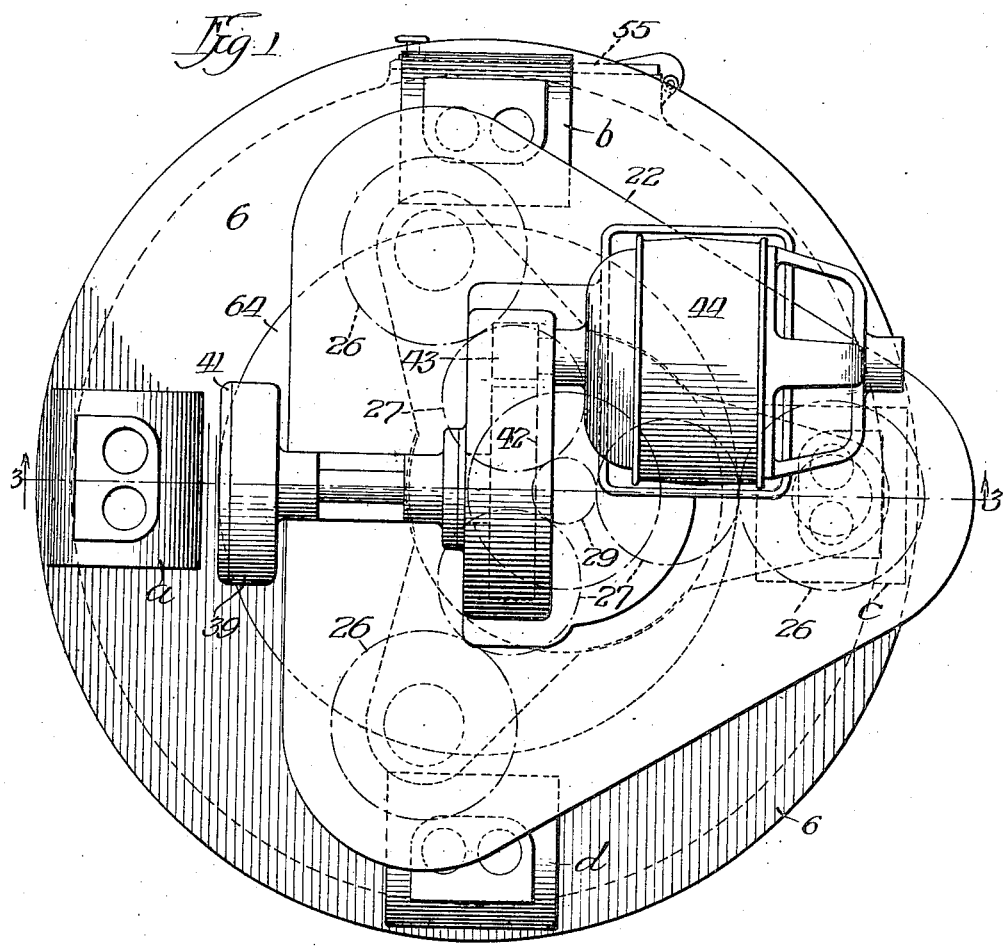
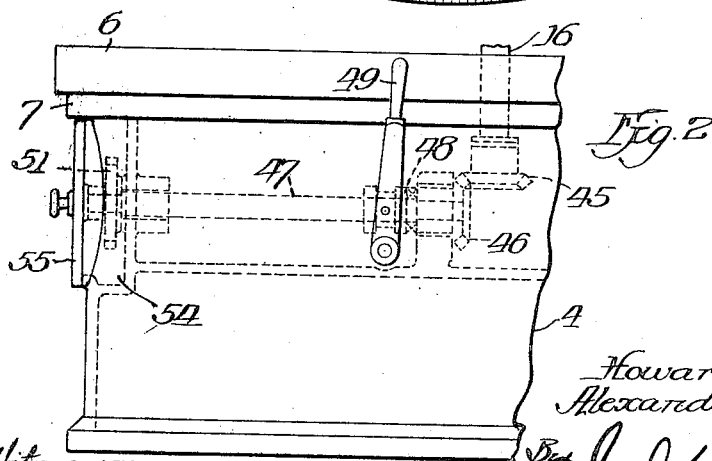
Inventors:
Howard C. Rose,
Alexander Oberhoffken

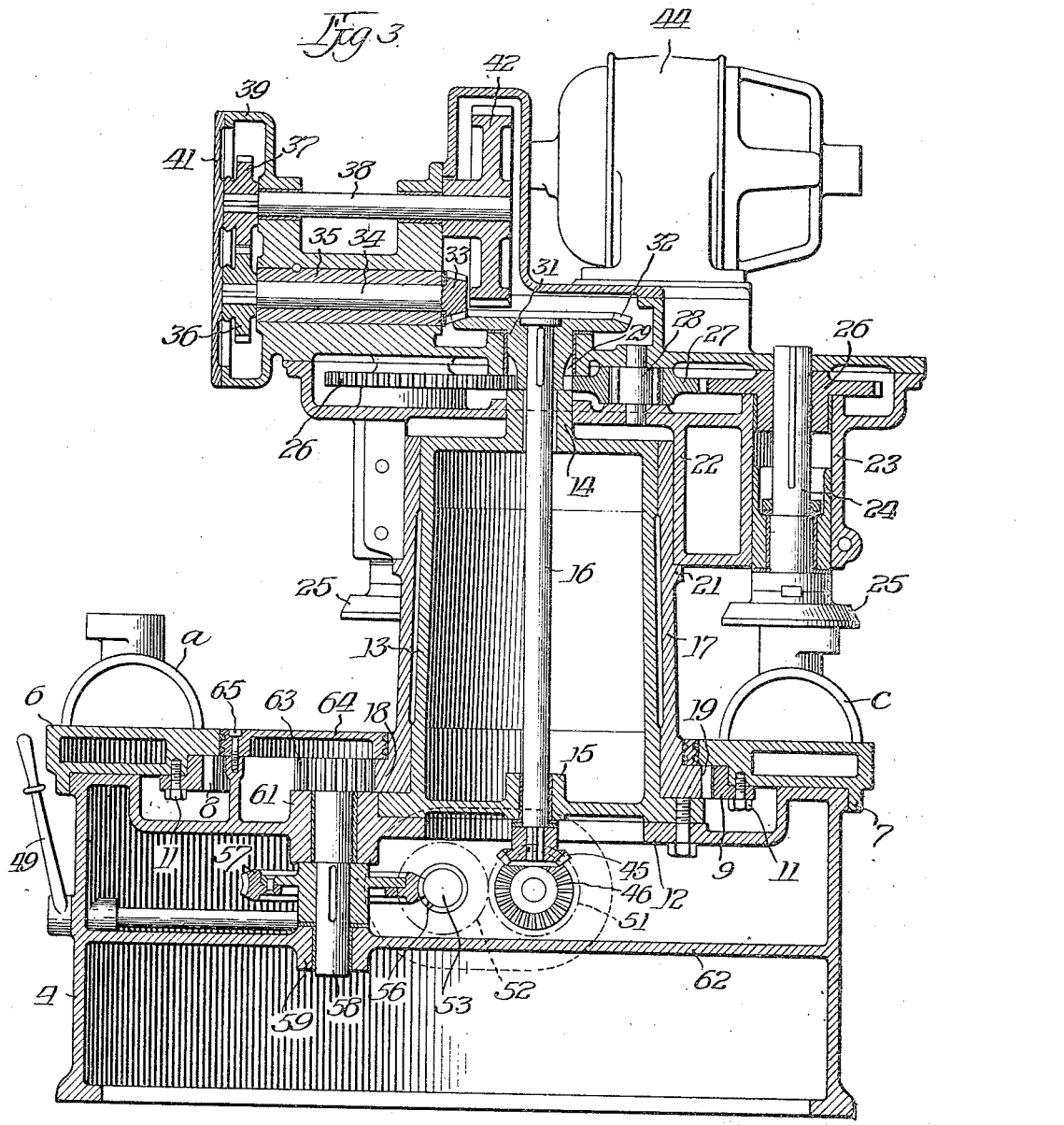

Patented July 10, 1923.

1,461,098

UNITED STATES PATENT OFFICE.

HOWARD C. ROSE AND ALEXANDER OBERHOFFKEN, OF DETROIT, MICHIGAN, ASSIGNORS TO INGERSOLL MILLING MACHINE COMPANY, OF ROCKFORD, ILLINOIS, A CORPORATION OF ILLINOIS.

MILLING MACHINE.

Application filed August 15, 1921. Serial No. 492,426.

*To all whom it may concern:*

Be it known that we, HOWARD C. ROSE and ALEXANDER OBERHOFFKEN, citizens of the United States and Germany, respectively, residing at Detroit, in the county of Wayne and State of Michigan, have invented certain new and useful Improvements in Milling Machines, of which the following is a specification.

This invention relates in general to milling machines, and the specific embodiment herein disclosed is of the type commercially known as "circular" milling machines.

Circular milling machines have heretofore been devised, embodying a rotatable work carrier equipped with a plurality of movable work supports adapted to rotate beneath, and at a different speed from, a concentrically mounted tool carrier equipped with a plurality of surfacing tools. In these machines, the relative movement between the work and the tools is in a direction at right angles to a radius of the carrier intersecting the work. This right line relative movement between the work and the tools, however, is not suitable for surfacing some shapes of work, which are best finished when the tool travels from end to end of the work in an arcuate path.

Our present invention is designed to provide a machine which will cause a relative movement between the work and the tools in an arcuate path, the tools moving relatively to the work throughout substantially their entire working path in directions oblique to the radii of the work carrier.

Another object of our invention is to provide a machine which will be continuous in operation, and which will have what is known as a "loading station," at which station the work will be free from the tools so that it can be removed and replaced by a new piece of work without stopping the machine.

Another object is to provide a machine which is simple in construction, efficient and economical in operation, and one which will be adapted to rapidly and accurately finish a large number of pieces of work in a short space of time, and which can be operated and attended to by one operator.

Other objects and advantages of our invention will be readily appreciated as the same becomes better understood, by reference to the following description, when considered in connection with the accompanying drawings.

Referring to the drawings:

Fig. 1 is a plan view of a milling machine embodying our invention;

Fig. 2 is a fragmentary side elevation; and

Fig. 3 is a longitudinal sectional view on the line 3—3 of Fig. 1.

By reference to the drawings, it will be observed that the machine comprises essentially, a base 4 of circular construction, upon which the various operating parts and mechanisms are carried. A circular table or work carrier 6 is concentrically mounted and adapted to be rotated upon the base 4, being guided and retained against displacement by a circumferential depending flange 7 surrounding the upper margin of the base. This work carrier is equipped with a plurality of clamps or work supports of any preferred type (not herein shown) adapted to clamp the work to the carrier. In the present instance, four pieces of work in the form of engine blocks, are shown as mounted on the carrier, and for purposes of making clear the operation of the machine, these pieces are indicated as "*a, b, c* and *d*" respectively. The inner circumference of the work carrier is equipped with internal gear teeth 8, and in the present instance, these teeth are shown as formed in a gear ring 9 secured to the work carrier by a series of bolts 11.

Upon the depressed top 12 of the base, there is rigidly mounted eccentrically with respect to the vertical axis of the base, a cylindrical standard 13 of hollow construction, as shown in Fig. 3, equipped at its upper and lower ends with vertical bearings 14 and 15 respectively, in which the vertical drive shaft 16 is journaled.

A hollow cylindrical column 17 surrounds and rotatably fits the standard 13, the lower horizontally disposed flange 18 of this column being provided with external gear teeth 19 meshing with the internal gear teeth 8 and adapted to drive the gear ring 9 and thereby the work carrier 6. This column is also equipped with a circumferential flange 21 intermediate its ends, adapted to form a support for the tool carrier proper 22, which fits over the column and is splined or otherwise securely locked thereto.

This tool carrier is shaped to provide a plurality (in the present instance three) spindle bearings 23, in each of which is rotatably mounted a tool spindle 24 carrying at its lower end a surfacing tool 25 in the form of a milling cutter. Each spindle has splined thereon near its upper end a gear wheel 26, each meshing with its respective idler wheel 27 journaled on a pintle 28 in the tool carrier head. These idlers each mesh with and are driven by pinion teeth 29 formed on the periphery of the hub 31, which is fixed to the upper end of the shaft 16 and equipped with a bevel gear 32. This bevel gear is driven by a bevel pinion 33 on the end of a countershaft 34 journaled in a bearing 35 in the head of the tool carrier, this shaft being equipped at its other end with a spur gear 36 which meshes with and is driven by a similar spur gear 37 fixed on a shaft 38. The gears 36 and 37 are enclosed in a housing 39 having a removable end plate 41, permitting access to the gears so that they may be changed if desired, to vary the driving speed. A spur gear 42 on the other end of shaft 38 meshes with and is driven by a pinion 43 fixed on the shaft of a driving motor 44. It will be manifest that through this train of driving mechanism, the surfacing tools are all simultaneously revolved in the same direction.

The lower end of the drive shaft 16 is equipped with a bevel pinion 45 which drives a companion bevel gear 46 loosely mounted on a horizontally extending shaft 47 and adapted to be connected therewith by a clutch 48 controlled by a lever 49. The outer end of shaft 47 carries a change gear 51 meshing with a companion change gear 52 on a parallel shaft 53, the gears 51 and 52 being adapted to be changed to vary the drive speed, and these gears being disposed in accessible position in a housing 54 at one side of the machine, which is normally closed by a hinged door or closure 55. The inner end of shaft 53 is equipped with a worm 56 which meshes with and drives a worm wheel 57 fixed upon a vertical shaft 58 which is journaled in bearings 59 and 61 formed in the web 62 and the top 12 respectively of the base. The upper end of shaft 58 is provided with a pinion 63 which meshes with the gear teeth formed on the column flange 18, whereby this column and the tool carrier mounted thereon is revolved. It will thus be apparent that while the tools are being rotated on their respective axes, the tool carrier as a whole is being simultaneously revolved, and since the tool carrier column is in meshing relation with the internal gear of the work carrier, the work carrier will also be revolved in the same direction as the tool carrier but at a different, and in the present instance, slower speed.

Since the tool carrier is mounted eccentrically with respect to the work carrier, the space between the tool carrier column and the inner perimeter of the work carrier is filled by an eccentric ring or table 64 secured by bolts 65, or otherwise, to the top of the base 4. A smooth top is therefore afforded, formed partially by this ring 64 and partially by the upper surface of the work carrier which is flush therewith.

Assuming the parts to be in the position shown in Fig. 1 of the drawings, it will be manifest that the piece of work $a$ is disposed at that side of the machine which is known as the "loading station" where the finished work is removed and replaced by a new piece of work. At this station, the work is entirely free from the tools for the reason that the number of pieces of work exceeds by one the number of finishing tools carried by the machine. If the machine is now thrown into operation, the work carrier and the tool carrier will both revolve in a clockwise direction, for instance, but at different speeds, the tool carrier being adapted to travel faster than the work carrier. Just prior to the time that the new piece of work reaches the position $b$, it will become overlapped and operated upon by the following cutter tool 26, and because of the eccentricity of the tool carrier with respect to the work carrier, the travel of the tool over the work will be in a direction outwardly as well as circumferentially, with the result that the tool moves outwardly over the work in a direction oblique to the radii of the work carrier intersecting the surface being worked until it reaches the position $c$, from which point to position $d$ the tool will move inwardly over the work in a direction oblique to said radii. the total movement of the tool with respect to the work being in a generally arcuate path. Shortly after the work leaves the position $d$ the tool will leave the work and pass onward in front of the work so that when the work has made a complete traverse of the machine, its upper surface has been completely finished by the tool and the tool has completely withdrawn from the work, so that it is free to be unclamped from the work carrier, removed and replaced by another piece before the succeeding tool catches up to the work.

It is believed that our invention, construction, mode of operation, and many of its attendant advantages will be understood and appreciated from the foregoing without further description, and while we have shown and described a preferred embodiment, obviously the details of construction of the invention may be varied within wide limits without exceeding the scope of the invention as defined in the following claims.

We claim:

1. In a milling machine, the combination of a rotatable work carrier, a rotatable tool carrier, and a plurality of tools carried thereby, said carrier being arranged to cause a relative movement between said tools and said work carrier in a direction oblique to the radii of said work carrier intersecting said work.

2. In a milling machine, the combination of a work carrier, a tool carrier, and a plurality of tools carried thereby, said carrier being arranged to cause said tools to traverse said work carrier and simultaneously vary the radial distance of each tool from the center of said work carrier.

3. In a milling machine, the combination of a work carrier, a tool carrier, a plurality of tools carried thereby, and means for effecting movement of one of said carriers eccentrically with respect to the other to subject the work to the action of said tools.

4. In a milling machine, the combination of a work carrier, a tool carrier mounted eccentrically thereof, a plurality of tools carried thereby, and means for revolving said tool carrier so as to cause travel of said tools radially and circumferentially with respect to said work carrier.

5. In a milling machine, the combination of a circular work carrier, a tool carrier mounted eccentrically of said work carrier, a plurality of tools carried by the tool carrier, and means for simultaneously imparting rotary movement to said carriers in the same direction but at different speeds, the eccentricity of said carriers being adapted to continuously vary the radial distance of each tool from the center of said work carrier.

6. In a milling machine, the combination of a rotatable work carrier, a standard mounted eccentrically thereof, a tool carrier rotatably mounted on said standard, a plurality of tools carried by said tool carrier, means for simultaneously rotating said carriers in the same direction but at different speeds about their respective centers, and means for revolving each tool about its own axis.

7. In a milling machine, the combination of a tool carrier supporting standard, a column surrounding said standard, a tool carrier fixed thereon, a work carrier surrounding said standard and disposed eccentrically relatively thereto, an internal gear on said work carrier, an external gear on said tool carrier column meshing therewith, and means for rotating said column whereby to drive said work carrier and tool carrier in the same direction but at different speeds about their respective centers.

8. In a milling machine, the combination of a circular base, a work carrier rotatably mounted upon and concentrically with said base, a standard disposed eccentrically with respect to said base and extending upwardly therefrom, a column rotatably mounted on said standard, a tool carrier mounted upon said column, a plurality of tools rotatably mounted in said tool carrier, means for rotating said column and the tool carrier mounted thereon, and a driving connection between said column and said work carrier through which said work carrier is revolved in the same direction but at different linear speed from said column.

9. In a milling machine, the combination of a base, a circular work carrier rotatably mounted thereon, a tool carrier including a column rotatably mounted on said base eccentrically of said work carrier, an eccentric ring stationarily mounted between said column and said work carrier, means for rotating said column, and driving connections between said column and said work carrier.

HOWARD C. ROSE.
ALEXANDER OBERHOFFKEN.